United States Patent [19]

Lee et al.

[11] Patent Number: 5,175,629
[45] Date of Patent: Dec. 29, 1992

[54] SUPERIMPOSING CIRCUIT FOR A VIDEO APPARATUS

[75] Inventors: Jhe H. Lee, Suweon; Hyun J. Park, Seoul, both of Rep. of Korea

[73] Assignee: Samsung Electronics Co., Ltd., Suweon, Rep. of Korea

[21] Appl. No.: 813,614

[22] Filed: Dec. 26, 1991

[30] Foreign Application Priority Data

Dec. 26, 1990 [KR] Rep. of Korea ............... 90-20844
Sep. 5, 1991 [KR] Rep. of Korea ............... 91-15512

[51] Int. Cl.$^5$ .......................................... H04N 5/76
[52] U.S. Cl. .................................. 358/310; 358/335; 358/906; 358/909; 358/319; 360/18
[58] Field of Search ............... 358/310, 319, 320, 335, 358/337, 906, 909, 181, 183, 22; 360/18, 20

[56] References Cited

U.S. PATENT DOCUMENTS 4,688,105 8/1987 Bloch et al. ................. 358/335
4,947,264 8/1990 Narusawa ................... 358/337
5,065,252 11/1991 Yoshio et el. ............... 358/335
5,097,348 3/1992 Suetaka ..................... 358/335

Primary Examiner—Tommy P. Chin
Assistant Examiner—Khoi Truong
Attorney, Agent, or Firm—Sughrue, Mion, Zinn, Macpeak & Seas

[57] ABSTRACT

A superimposing circuit for a video apparatus comprises a first switch circuit for selecting an input video signal in response to a selected record or a playback mode, a second switch circuit for synthesizing a video signal and character information during the record mode, a third switch circuit for synthesizing the video signal and the character information during the playback mode, a switch device, a comparator for receiving the output of the switch device as a reference level, a character generating circuit, and a controller for controlling the switching of the second switch circuit and the third switching circuit in accordance with the selected one of the record mode and the playback mode.

6 Claims, 2 Drawing Sheets

SUPERIMPOSING CIRCUIT FOR A VIDEO APPARATUS

FIELD OF THE INVENTION

The present invention relates to a superimposing circuit for a video apparatus in which a title containing characters, images and the like is produced and is synthesized together with an image signal during the picture-taking or the recording and playing back of a video camera or a video cassette recorder.

BACKGROUND OF THE INVENTION

Conventional techniques for performing a superimposing function are provided and the superimposing function is performed only when a video camera is set in a camera mode, and a title such as characters and the like is synthesized with an image signal, whereby the picture recorded is edited.

However, because the superimposing function is performed only during the time the picture-taking mode of the video camera is employed, the title such as characters can not be changed when playing back the already recorded image signal, and new characters can not be additionally synthesized.

In addition, because a video cassette recorder has no superimposing function, it has been difficult to edit pictures using the video cassette recorder.

SUMMARY OF THE INVENTION

Therefore, it is an object of the present invention to provide a superimposing circuit for a video apparatus in which a superimposing function is provided during either a picture-taking or playback mode of a video camera as well as a record or playback mode of a video cassette recorder, so that a picture editing by the video camera or video cassette recorder is made more versatile.

To achieve the object, according to the present invention, a video apparatus having a Y/C processor for processing an input video signal and a head for receiving the video signal from the Y/C processor during recording and providing information from a video tape to the Y/C processor during play back comprises a first switch circuit for receiving the video signal from the video cassette recorder or video camera during a record mode and receiving the video signal played back by the Y/C processor part during a playback mode, thereby selecting the input video signal source in accordance with the record or playback mode, a second switch circuit switched such that character information is synthesized with the video signal during the record mode for inputting the video signal into the Y/C processor, a third switch circuit switched so that an output of the Y/C processor is provided to a monitor during the record mode and the character information and the output of the Y/C processor are synthesized during the playback mode, a switch device for selecting the on/off state of the superimposing function, a comparator for receiving an output of the switch device as a reference level and receiving the output of the first switching circuit as a comparative signal, thereby producing the compared output, a character generating circuit connected to the switch device for output of the character information into the second switch superimposing ON-mode, and a controller for receiving the output of the comparator as a clock and for controlling, by switching the second switch circuit and the third switch circuit, in accordance with the record or playback mode.

DETAILED DESCRIPTION OF THE PREFERRED EMBODIMENT

Now, an embodiment of the present invention will be described with reference to the drawings.

Figure 1:
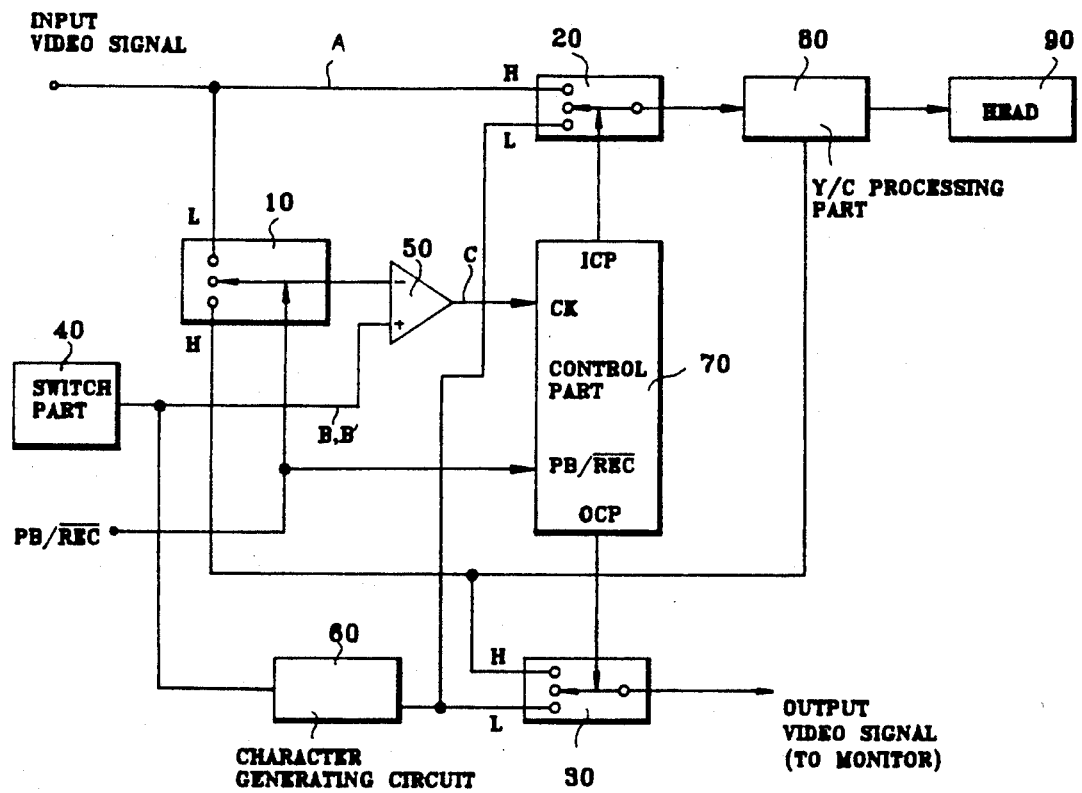
FIG. 1 is schematic diagram illustrating a superimposing apparatus according to the present invention.

FIG. 1 shows the entire configuration by way of a schematic diagram of a superimposing circuit according to the present invention. An input terminal for a video signal generated during a camera mode of a video camera or in a record mode of a video cassette recorder is connected to a low terminal L of a first switch circuit 10 and to a high terminal H of a second switch circuit 20. A high terminal H of the first switch circuit 10 is connected to a reproducing output terminal of a Y/C processor 80 and to a high terminal H of a third switch circuit 30, and an output terminal of the first switch circuit 10 is connected to an inversion terminal of a comparator 50.

As shown in FIG. 1, an output terminal of a switch circuit 40 is connected to a non-inverting terminal of the comparator 50 and to an input terminal of a character generating circuit 60, the output terminal of the comparator 50 is connected to a clock terminal CK of a controller 70, and an input terminal with a signal for playback PB or record REC mode selection generated by the video camera or video cassette recorder is connected to a control terminal of the first switch circuit 10 and to a playback and record input terminal PB/REC of the controller 70.

On the other hand, the output terminal of the character generating circuit 60 is connected to each low terminal L of the second switch circuit 20 and the third switch circuit 30, an input control port ICP of the controller 70 is connected to the control terminal of the second switch circuit 20, and an output control port OCP is connected to the control terminal of the third switch circuit 30.

Also, the Y/C processor 80 is connected together with a head 90 so as to provide and receive the video signal. Thus, a superimposing circuit of the present invention is constructed.

In FIG. 1, the first, second and third switch circuits 10, 20, 30 are three state analog switches, respectively, and an output terminal is connected to an intermediate terminal in the usual manner, i.e., in the case when there is not input into the control terminal, and the high terminal H is connected to the output terminal when a signal of logic "H" is applied to the control terminal, while a low terminal L is connected with the control terminal when one of logic "L" is applied the switch circuit.

On the other hand, the character generating circuit 60 includes an internal memory stored with information on characters, which is driven by the logic "L" output of the switch device 40 to thereby output the information on the characters. The detailed description of the character generating circuit 60 is well known to those of ordinary skill in the art will be omitted in the interest of brevity.

Figure 2:
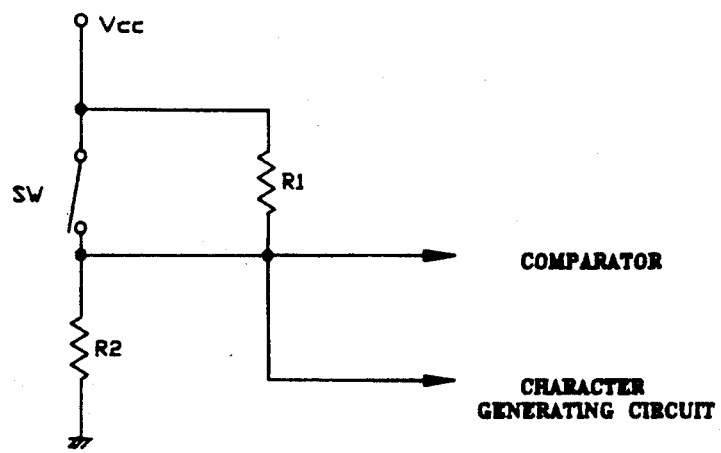
FIG. 2 is a circuit diagram of a switch device in FIG. 1.

The switch device 40, which is provided for selecting whether a user utilitzes the superimposing function or not, is constructed by the fragmentary circuit of the switch circuit shown in FIG. 2. That is, the switch device 40 includes voltage dividing resistors R1, R2 for dividing a voltage from a power supply source Vcc, and a selecting switch SW provided in parallel with the voltage dividing resistor R1 at one side, so that the superimposing function advantageously can be turned ON when the selection switch SW is turned ON.

The operation of the switch device 40 of the present invention while the selecting switch SW is turned ON is carried out such that the signal of the logic "H" of the power supply source Vcc level is output and provided to the non-inverting terminal of the comparator 50 as a reference level.

Under this condition, a maximum level of the recorded or played back video signal is set to a lower potential than that of the voltage of power supply source Vcc, so that the signal of the comparator 50 is output with the logic L"L" all the time.

On the other hand, when the selection switch SW is turned OFF, the voltage of the power supply source Vcc is divided by the resistors R1, R2 and, thereby, a reference level of the comparator 50 is output with a lower potential than the maximum level of the video signal.

Figure 4:
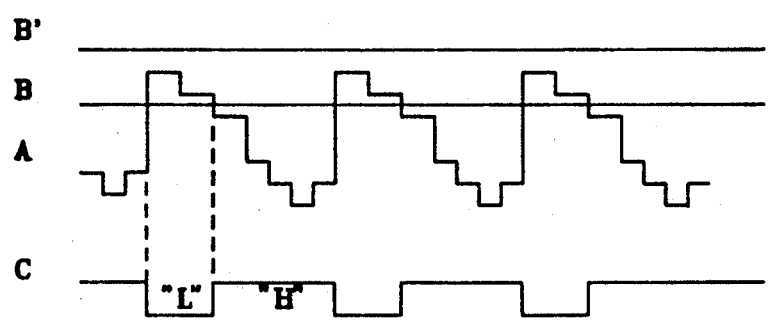
FIG. 4 provides illustrative waveforms of signals used in each part of the apparatus shown in FIG. 1.

FIG. 4 illustrates the waveforms of signals used in each part of FIG. 1, in which, in case of turning OFF the superimposing function (the selecting switch is turned ON), an output level B' of the switch device 40 is a higher level than a maximum level of a point waveform A at the video signal input terminal, while an output level B of the switch device 40, in case of turning ON the superimposing function (the selecting switch is turned OFF), is a lower level than a maximum level of the point waveform A.

Therefore, the output of the comparator 50 is set to the logic "H" when the superimposing function is turned OFF, and the controller 70 does not control the output. The output signal with the logic "L" from the comparator 50, as shown in waveform C of FIG. 4, during high level (a higher level than a waveform B) of the recorded or played back video signal when the superimposing function is turned ON, is controlled by the controller 70.

In the controller 70, a signal having the logic "H" is applied to the record and playback input terminal PB/REC during the playback mode PB, and one of the logic "L"is applied during the record mode REC. Thus, when turning OFF the superimposing function, the input control port ICP is normalized and the output control port OCP outputs the logic "H" during the playback mode, while the input control port ICP outputs the logic "H" and the output control port OCP is normalized during the record mode REC. It should be noted that input and output control ports ICP, OCP refer to specific ports of controller 70.

More specifically, first, in the picture-taking mode of the video camera (or in the record mode of the VCR), a signal such as waveform A in FIG. 4 is applied to the low terminal L of the first switch circuit 10 and to the high terminal H of the second switch circuit 20. Under this condition, as the first switch circuit 10 is selected with the low terminal L during the record mode, the recorded video signal is input to the inverting terminal of the comparator 50.

Thus, when the superimposing function is turned ON, the reference level signal, e.g., a waveform B of FIG. 4, is applied to the non-inverting terminal of the comparator 50, and the logic "H" of the comparator is output only when the video signal is lower than the level of the waveform B and is then applied to the clock terminal CK of the controller 70.

Accordingly, the input control port ICP of the controller 70 becomes the logic "H", and the second switch circuit 20 is connected to the selected high terminal H.

Consequently, the video signal is input to the Y/C processor 80, applied to the head 90, and recorded on the video tape.

Thereafter, when the video signal is input with a higher level than the reference level, the output of the comparator 50 becomes the logic "L" during the high level, and the input control port ICP of the controller 70 becomes the logic "L".

Accordingly, the low terminal L of the second switch circuit 20 is selected, and the output of the character generating circuit 60 is provided through the second switch circuit 20 to the Y/C processor 80 and is processed and recorded as the video signal via the head 90 onto the video tape.

The character information in the character while the video signal is higher than the reference level. When the video signal becomes lower than the reference level, the video signal for monitoring is recorded again on the video tape according to the above described operation.

Thus, the input video signal is synthesized with the character information from the character generating circuit 60 and is recorded on the video tape during the record mode. At that time, the third switch circuit 30 is normalized and no video signal is output.

On the other hand, during the playback mode, the signal of the logic "H" is applied to the playback-/record input terminal PB/REC of the controller 70 and to the control terminal of the first switch circuit 10, thereby selecting the high terminal H, so that the first switch circuit 10 outputs the playback signal from the Y/C processor 80 to the comparator 50.

At this time, when the superimposing function is turned OFF, since the reference level of the comparator 50 is at a higher level than the video signal (the waveform A of FIG. 4, which is played back like a waveform B' of FIG. 4) the output control port OCP of the controller 70 becomes the logic "H", so that the third switch circuit 30 outputs only the played back video signal output from the Y/C processor 80.

However, when the superimposing function is turned ON, the reference level of the comparator 50 is as illustrated by a waveform B, and in that case, when the video signal is at a higher level than the reference level, the output of the comparator 50 becomes logic "L". At that time, the output control port OCP of the controller 70 becomes logic "L", and the character information from the character generating circuit 60 outputs the video signal through the low terminal L, thereby being synthesized to the played back video signal.

Thus, the video signal is output while the range of the video signal is lower than the reference level and the character information is output while the range of the video signal is higher than the reference level, so that a picture in which the character information is synthesized with the video signal is displayed on a monitor.

Figure 3:
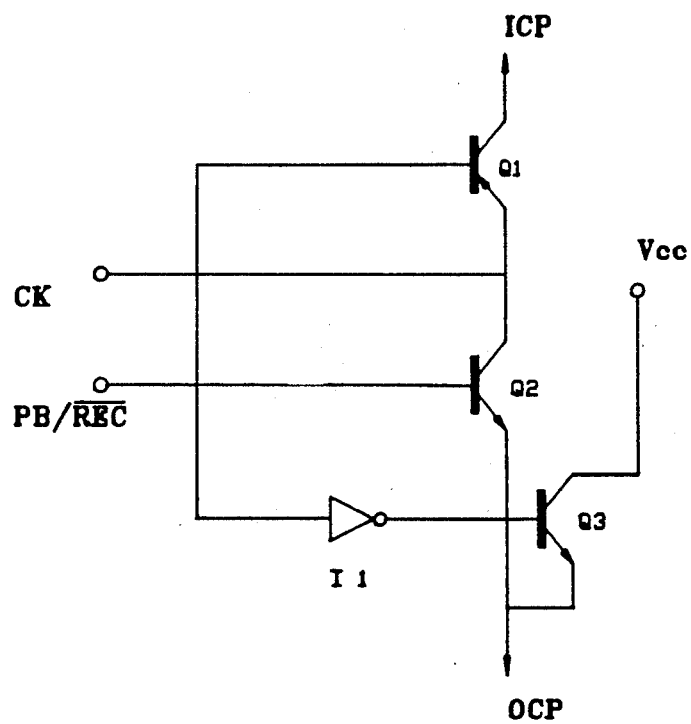
FIG. 3 is a circuit diagram of a controller in FIG. 1.

It should be noted that the controller 70 can be provided as a transistor circuit as shown in FIG. 3, which comprises a transistor Q1 receiving a clock signal as a driving power supply source and which is turned on during the record mode for including the input control port ICP, a transistor Q2 receiving a clock signal as a driving power supply source and which is turned on during the playback mode for being inversely driven with respect to the transistor Q1, a transistor Q3 receiving a power supply source Vcc as a driving power supply source, for applying an inverse bias during the playback mode, and for applying a forward bias during the record mode, and for including an output control port OCP together with the transistor Q2, and an inverter I1 for setting a bias condition of the transistor Q3 which is inverted with respect to a bias condition of the transistor Q2.

In other words, an emitter of PNP type transistor Q1 is connected to a collector of a NPN type transistor Q2, so as to provide a clock terminal CK and is input with a clock signal from the comparator 50. Each base of the transistors Q1, Q2 is connected to the other, which provides a playback and record input terminal PB/REC. A base of the transistor Q3 is connected to the playback and record input terminal PB/REC through the inventer I1, while its collector is connected to the power supply source Vcc, and its emitter, together with that of the transistor Q2, provides the output control port OCP.

The circuit configuration shown in FIG. 3 provides the same operation and effect as the controller 70 of FIG. 1.

In other words, during the playback mode, a logic "H" is applied to the bases of the transistors Q1, Q2 and an inverse logic "L" is provided to that of the transistor Q3 through the inverter I1, so that the transistors Q1, Q3 are turned OFF, and the transistor Q2 is forward biased and is turned ON by and input from the clock terminal.

Accordingly, when the superimposing function is turned OFF, because the clock terminal CK is constantly providing a logic "H", the transistor Q2 is in a turned ON state, and thus, the output control port OCP is set to a logic "H", so that the high terminal H of the third switch circuit 30, as shown in FIG. 1, is connected to the video output side of the circut and the playback signal from the Y/C processor 80 is displayed on the monitor 100.

When the superimposing function is turned ON, because the output of the comparator 50 is changed into a logic "H" or into the logic "L" in response to the signal level, the transistor Q2 is also turned ON or OFF in response to the output level of the comparator 50, and the level of the output control port OCP is changed.

On the other hand, during the record mode, the record and playback input terminal PCB/REC are set to the logic "L". The transistor Q2 is turned OFF, the transistors Q1, Q3 are forward biased, the transistor Q1 is turned ON or OFF in response to the input to the clock terminal CK, and the transistor Q3 is turned ON and applies the power supply source Vcc to the output control port OCP, thereby maintaining a logic "H" state.

Accordingly, the video signal processed at the Y/C processor 80 is recorded on the video tape via the head 90 and is simultaneously output to the monitor through the third switch circuit 30, and displayed thereon.

Because the transistor Q1 is in a turned ON state all the time, when the superimposing function is turned OFF, the video signal provided from the video cassette recorder or the camera is input into the Y/C processor 80 through the second switch circuit 20. The level at the clock terminal CK is changed by inverting in accordance with the level of the input video signal when the superimposing function is turned ON, and therefore, the second switch circuit 20 is switched with it, and the video signal is synthesized with the character information.

As described above, the superimposing circuit for the video apparatus according to the present invention comprises a first switch circuit for receiving the video signal according to the video cassette recorder or the camera during the record or picture-taking mode, for receiving the video signal reproduced by the Y/C processor during the playback mode, and selecting the input video signal source in accordance with the record or the playback mode, a second switch circuit is switched so that the character information is synthesized to the video signal during record mode for providing an input to the Y/C processor, a third switch circuit is switched so that the character information is synthesized to the video signal during the playback mode, a switch device for selectively turning ON or OFF the superimposing function, a comparator for receiving the output of the switch part as a reference level and for receiving the output of the first switch circuit as a comparative signal, thereby providing the compared signal, a character generating circuit for outputting the character information stored internally, when turning on the superimposing function, into the second switch circuit and into the third switch circuit by the switch device and a controller for receiving the output of the comparator and for controlling the second switch circuit and the third switch circuit in accordance with the record or playback mode. Thus, according to the present invention, the character information such as a title and so on is free to be synthesized to the video signal in the camera picture-taking or recording by the video cassette recorder as well as during the playback mode, thereby improving the benefits of the apparatus.

What is claimed is:

1. A superimposing circuit for a video apparatus performing a superimposing operation and having Y/C processing means for processing an input video signal and a head for receiving a video signal from said Y/C processing means during a record mode and providing information from a video tape to said Y/C processing means during a playback mode, comprising:

a first switch circuit for receiving a video signal provided by one of a video cassette recorder and a video camera during said record mode, and for receiving a playback video signal provided by said Y/C processing means during said playback mode and for selecting said input video signal in accordance with a selected one of the record mode and the playback mode;

a second switch circuit switched so as to permit character information to be synthesized with said video signal during the record mode thereby providing an input to said Y/C processing means;

a third switch circuit for providing an input from said Y/C processing means to a monitor during the record mode, said third switch circuit being switched so as to permit the output from said Y/C processing means and said character information to be synthesized during the playback mode;

switch means for selectively turning ON and OFF said superimposing operation;

a comparator for receiving the output from said switch means as a reference level and for receiving the output from said first switch circuit as a comparative signal and for providing a compared output;

a character generating circuit connected to said switch means for outputting said character information stored therein to said second switch circuit and into said third switch circuit when the superimposing operation is turned ON; and control means for receiving the output from said comparator as a clock signal and for controlling said second switch circuit and said third switch circuit in accordance with said selected one of said record mode and said playback mode.

2. The superimposing circuit for a video apparatus as claimed in claim 1, wherein said switch means comprises:

voltage dividing resistors for dividing a voltage provided by a power supply source; and a switch provided in parallel and operatively coupled to both ends of one of said voltage dividing resistors.

3. The superimposing circuit for a video apparatus as claimed in claim 1, wherein said control means comprises:

a first transistor for receiving said clock signal as a first driving power supply source, said first transistor being turned ON during a record mode, for defining an input control port;

a second transistor for receiving said clock signal as a second driving power supply source, said second transistor being turned ON during playback mode for inversely driving said second transistor with respect to said first transistor;

a third transistor receiving a power supply source as a third driving power supply source and provided with an inverse bias during the playback mode and provided with a forward bias during the record mode for defining an output control port together with said second transistor; and an inverter for setting a third transistor bias condition which is inverted with respect to a second transistor bias condition.

4. A superimposing circuit for a video apparatus for superimposing character information on an input video signal to thereby provide a superimposing function, said input video signal being provided by one of a video signal produced by a selected one of a video cassette recorder and a video camera during a record mode and a playback video signal provided by a Y/C processor during a playback mode, said Y/C processor processing said video signal and providing a processed video signal to a head during the record mode and receiving information corresponding to said processed video signal during the playback mode, comprising:

a first switch circuit for selecting said input video signal is accordance with a selected one of the record mode and the playback mode;

a second switch circuit switched so as to permit synthesization of character information with said video signal during the record mode by providing said character information to said Y/C processor;

a third switch circuit operatively connecting said Y/C processor to a monitor during the record mode, said third switch circuit being switched so as to permit the output from said Y/C processor means and said character information to be synthesized during the playback mode;

switch means for selectively turning ON or OFF said superimposing function;

a comparator for receiving the output from said switch means as a reference level and for receiving the output from said first switch circuit as a comparative signal and for providing a compared output signal;

a character generating circuit connected to said switch means for outputting character information stored internally to said second switch circuit and to said third switch circuit when the superimposing function is turned ON; and control means receiving the compared output signal as a clock signal for controlling said second switch circuit and said third switch circuit in accordance with the selected on of said record mode and said playback mode.

5. The superimposing circuit of claim 4, wherein said switch means comprises:

voltage dividing resistors for dividing a voltage provided by a power supply source, and a switch provided in parallel and operatively coupled to both ends of one of said voltage dividing resistors.

6. The superimposing circuit of claim 4, wherein said control means comprises:

a first transistor for receiving said clock signal as a first driving power supply source, said first transistor being turned ON during said record mode so as to define an input control port;

a second transistor for receiving said clock signal as a second driving power supply source, said second transistor being turned ON during playback mode so as to inversely drive said second transistor with respect to said first transistor;

a third transistor receiving a power supply source as a third driving power supply source and provided with a bias voltage, said bias voltage reverse biasing said third transistor during the playback mode and forward biasing said third transistor during the record mode, wherein said third transistor and said second transistor cooperatively defining an output control port; and an inverter for providing said bias voltage to said third transistor, said bias voltage being the inverse of a second transistor bias voltage.

* * * * *